United States Patent [19]
Durgin et al.

[11] 3,767,322
[45] Oct. 23, 1973

[54] INTERNAL COOLING FOR TURBINE VANES

[75] Inventors: George A. Durgin, Claymont, Del.; Philip S. Barnabei, Medford, N.J.

[73] Assignee: Westinghouse Electric Corporation, Pittsburgh, Pa.

[22] Filed: July 30, 1971

[21] Appl. No.: 167,586

[52] U.S. Cl. ................................... 416/97, 415/115
[51] Int. Cl. ............................................. F01d 5/08
[58] Field of Search ..................... 416/96, 96 A, 97, 416/90, 95; 415/115

[56] References Cited
UNITED STATES PATENTS

| | | | |
|---|---|---|---|
| 2,873,944 | 2/1959 | Wiese et al. | 416/97 UX |
| 3,032,314 | 5/1962 | David | 416/90 |
| 3,388,888 | 6/1968 | Kercher et al. | 415/115 |
| 3,475,107 | 10/1969 | Auxier | 415/115 |
| 3,623,318 | 11/1971 | Shank | 415/115 |

FOREIGN PATENTS OR APPLICATIONS
1,222,565    2/1971    Great Britain ......................... 416/97

*Primary Examiner*—Everette A. Powell, Jr.
*Attorney*—A. T. Stratton et al.

[57] ABSTRACT

A structure for internally cooling an airfoil vane in an axial flow gas turbine. The vane defines a cavity which approximates the shape of the outer airfoil. A frame of similar shape is inserted into the cavity in spaced relation therefrom. The cavity walls and the frame cooperatively define a cooling passageway. A row of oblong apertures is disposed along the leading edge of the frame and a second row of apertures is disposed along the convex side of the frame, the second row of apertures being inclined relative to the cavity wall. Pressurized cooling air enters the frame, is forced through the apertures, impinges against the inner walls of the vane, and flows along the passageway to cool the vane.

4 Claims, 6 Drawing Figures

INVENTORS
George A. Durgin &
Philip S. Barnabei

3,767,322

INTERNAL COOLING FOR TURBINE VANES

BACKGROUND OF THE INVENTION

The following relates to stationary blades or vanes in an axial flow gas turbine and more specifically to means for cooling the vanes.

As is well known in the art, one of the limiting factors in gas turbine design is the ability of the blades to withstand high gas turbine temperatures, particularly in the first and second stages of the turbine. One cooling vane structure is shown in J.A. Pyne, Jr., U.S. Pat. No. 3,574,481, patented Apr. 13, 1971. A similar type of vane cooling structure is disclosed in Gabriel application Ser. No. 43,533, filed June 4, 1970, now abandoned, and assigned to the present assignee.

One problem area of cooling turbine vanes is to direct the cooling fluid to localized high heat flux portions of the vane and to uniformly cool the vanes. A second problem area is to maximize the effectiveness of the cooling fluid by metering and channeling the cooling fluid along the vanes internal surfaces and preventing excessive cross flow of fluid from one side of the vane to the other.

Another problem is that there is a close tolerance requirement in positioning the frame within the vane cavity and therefore the close tolerances increase the cost of the blade.

It would be desirable then to devise a cooling system for a turbine vane which effectively directs the cooling fluid to the localized high heat flux portions of the vane, which system would more effectively cool the vane, and which system would easily position the insertable frame within the vane allowing for increased tolerances.

SUMMARY OF THE INVENTION

A cooling system for a turbine vane, the vane defining a cavity therein. The cooling system includes a hollow frame structure of generally airfoil shape, which is disposed within the cavity and is spaced therefrom. The wall of the cavity and the frame cooperatively define a cooling passageway of general airfoil shape. A row of apertures is disposed along the leading edge of the frame and cooling air is forced into the frame, through the apertures and impinges on the leading edge of the internal wall of the vane. After impingement, the cooling air divides in the passageway, one half flowing along the passageway on the convex (or Higher Heat Flux) side of the vane, and the other half flowing along the passageway on the concave or lower heat flux side of the vane.

A second row of apertures is disposed on the convex side of the frame, downstream of the leading edge. The apertures are inclined relative to the internal wall of the vane. A third row of apertures may be disposed further downstream of the second row of apertures in the frame, the apertures also being inclined relative to the internal wall of the vane. In both the second and third rows of apertures, cooling air within the frame is forced out through the apertures on the leading edge of the frame and impinges upon the internal wall of the vane. The cooling air impinging upon the side wall of the vane at a predetermined angle, thereby more effectively cools the localized high heat flux portion of the vane by direct impingement of metered coolant from within the frame.

An expandible seal structure is secured to the trailing edge of the frame with a plurality of apertures extending along the radial height of the seal structure. The apertures in the seal structure are designed to meter the coolant flowing along the concave surface of the vane and in turn equalize the static pressures on both sides of the apertures at the leading edge of the frame. Equalization of the static pressures at the frame leading edge will prevent deflection of the impinging jets of fluid and thereby prevents a maldistribution of cooling fluid between the concave and convex vane surfaces.

The expandible seal structure is made resilient so that the seal surface conforms to the cavity irregularities along the full height of the seal and thereby providing accurate metering of the coolant fluid through the apertures in the seal structure. The expandible seal structure also locates the frame within the vane cavity in such a manner as to provide accurate positioning of the frame to the convex surface of the vane allowing for increased vane cavity tolerances while maintaining cooling uniformity.

What is disclosed, then, is a cooling system for a hollow turbine vane, the cooling system distributing the cooling fluid to the localized high heat flow portions of the turbine vane to more uniformly cool the vane. Furthermore, the cooling system meters the cooling fluid and prevents excessive crossflow from one side of the vane to the other. Finally, the cooling system provides a frame insertable into the cavity in the vane which increases the tolerances between the frame and the cavity in the vane.

DESCRIPTION OF THE PREFERRED EMBODIMENT

Figure 1:
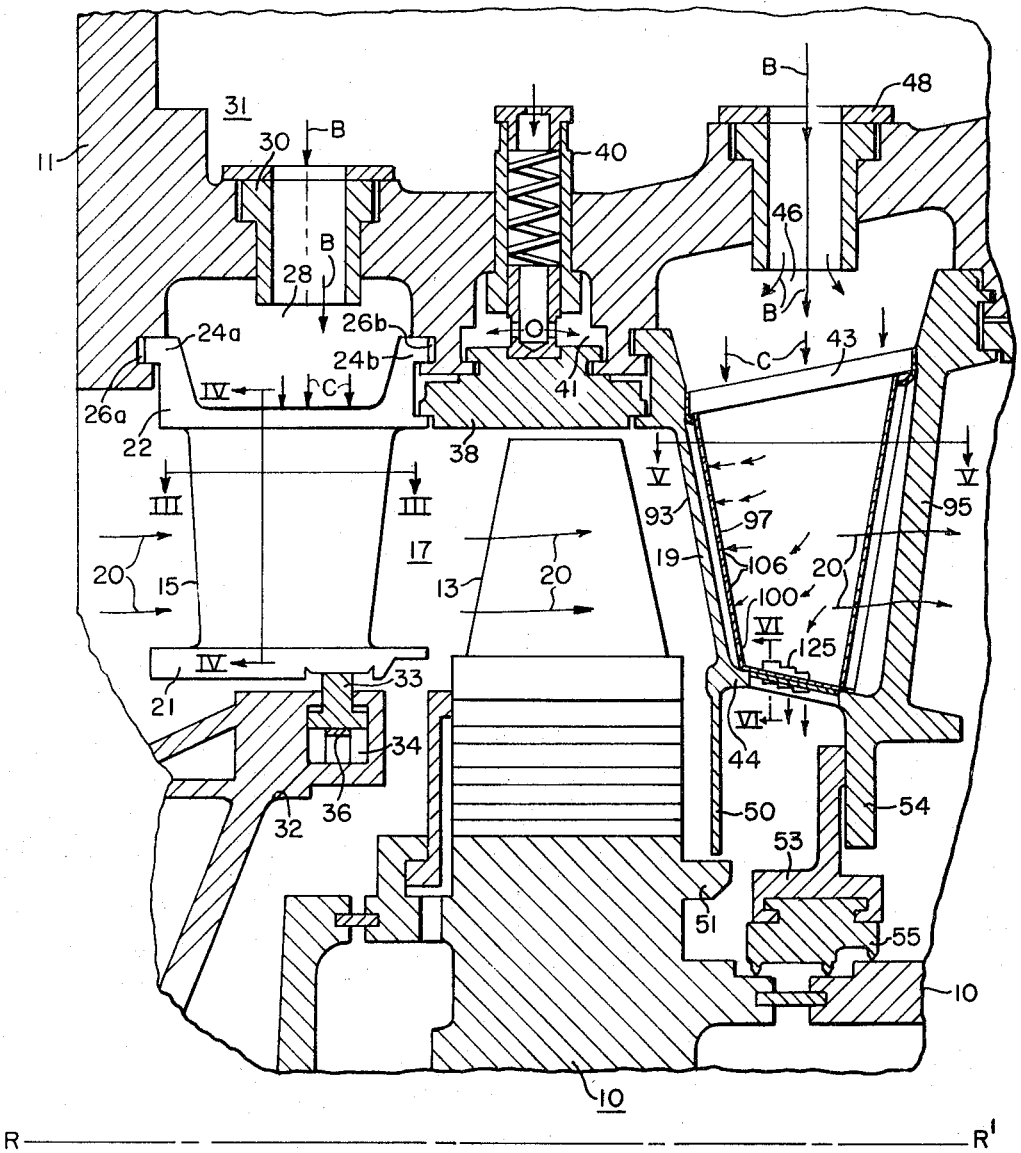
FIG. 1 shows a partial axial sectional view of a gas turbine having vane structures incorporating the invention therein.

Referring to the drawings in detail, and particularly in FIG. 1, there is shown a portion of an axial flow gas turbine having a rotor structure 10 and an inner casing structure 11. The rotor structure 10 is rotatably supported within the casing structure 11 in a manner well known in the art. At least one annular row of rotating blades 13 extend radially outward from the rotor 10. Cooperatively associated with the rotating blades is an annular row of stationary blades or vanes 15 which are supported from the casing 11 and project radially inwardly. The first row of rotating blades 13 and the first row of stationary blades 15 define the first turbine stage 17. A second row of stationary blades or vanes 19 is also shown, the second row having a larger area to expand the hot motor fluid, as indicated by the arrows 20, from left to right and as well known in the art.

The hot motor fluid, such as pressurized combustion gas, is generated in a plurality of circumferentially disposed combustion chambers (not shown). The gases flow pass the stationary blades 15 and 19 and the rotary blades 13 with resulting expansion of the gases to rotate the rotor 10 about its rotational axis R—R'. Each stationary blade 15 has a radially inner shroud 21 and a radially outer shroud platform 22. The platform 22 has axially extending projections 24a and 24b which extend into corresponding grooves 26a and ≈b in the casing structure 11 to secure the vanes 15 within the casing structure. The radially outer surface of the platform 22 and the casing structure 11 jointly define a continuous annular inner plenum chamber 28. A hollow tubular insert 30 is disposed in the casing structure 11 to provide fluid communication between an outer plenum chamber 31 and the inner plenum chamber 28.

An annular seal housing structure 32 is disposed on the radially inner side of the stationary blades 15. An annular seal structure 33 is disposed in an annular groove 34 within the housing structure 32 and is spring biased therein by spring 36 to urge the seal structure 33 into frictional abutment with the radially inner surface of the inner shroud 21. The seal structure 33 and shroud 21 cooperatively prevent leakage of the hot motive fluid, as represented by the arrows 20, from leaking around the stationary blades 15.

An annular segmented sealing member 38 is disposed within the casing structure 11. A tubular insert 40 is disposed within the casing structure 11 and is spring biased to maintain the sealing member in proper position. The sealing member 38 and the casing structure define an annular cavity 41, the insert 40 providing fluid communication between the outer plenum chamber 31 and cavity 41.

Immediately downstream of the first stage 17 is the second row of stationary blades 19. The blades 19 are disposed within the casing 11 in a similar manner to that described for the first row of stationary blades 15. Each stationary blade 19 has a radially outer shroud or platform 43 and a radially inner shroud 44. The radially outer shroud 43 and the inner casing structure 11 jointly define a plenum chamber 46. A tubular hollow insert 48 is disposed within the casing 11 and provides fluid communication between the outer plenum chamber 31 and the plenum chamber 46.

An annular projection 50 extends radially inward from the inner shroud 44 and cooperates with an axial projection 51 on the rotor structure 10 to provide a partial seal between the first stage 17 and the second stationary row of blades 19. An expandable seal structure 53 cooperates with a radially extending portion 54 of the vane 19 and the rotor 10 to effectively seal between the second row of vanes 19 and the second rotating row of blades (not shown). The seal structure 53 includes a labyrinth type of seal 55.

In accordance with the principles of the present invention, there is provided a cooling system for the turbine vanes 15 and 19. As seen in FIGS. 2, 3, 4 and 5 each turbine vane 15 is of general airfoil cross-section and defines a cavity 57. A hollow frame structure 58 is disposed within the cavity 57. The frame structure 58 is also of airfoil cross-section and is slightly smaller in size and similar in shape to the vane 15.

The internal wall 60 of the vane 15 and the external wall of the frame 58 cooperatively define a cooling passageway 61 of general airfoil cross-section. The passageway 61 extends along the radial height of the vane.

The vane 15 has a leading edge 62 (FIG. 3) and a trailing edge 63, the edges being connected by a convex side wall 65 and a concave side wall 66. Correspondingly, the frame 58 has a leading edge 67 and a trailing edge 68, the edges being connected by a generally convex side wall 70 and a generally concave side wall 71.

Figure 2:
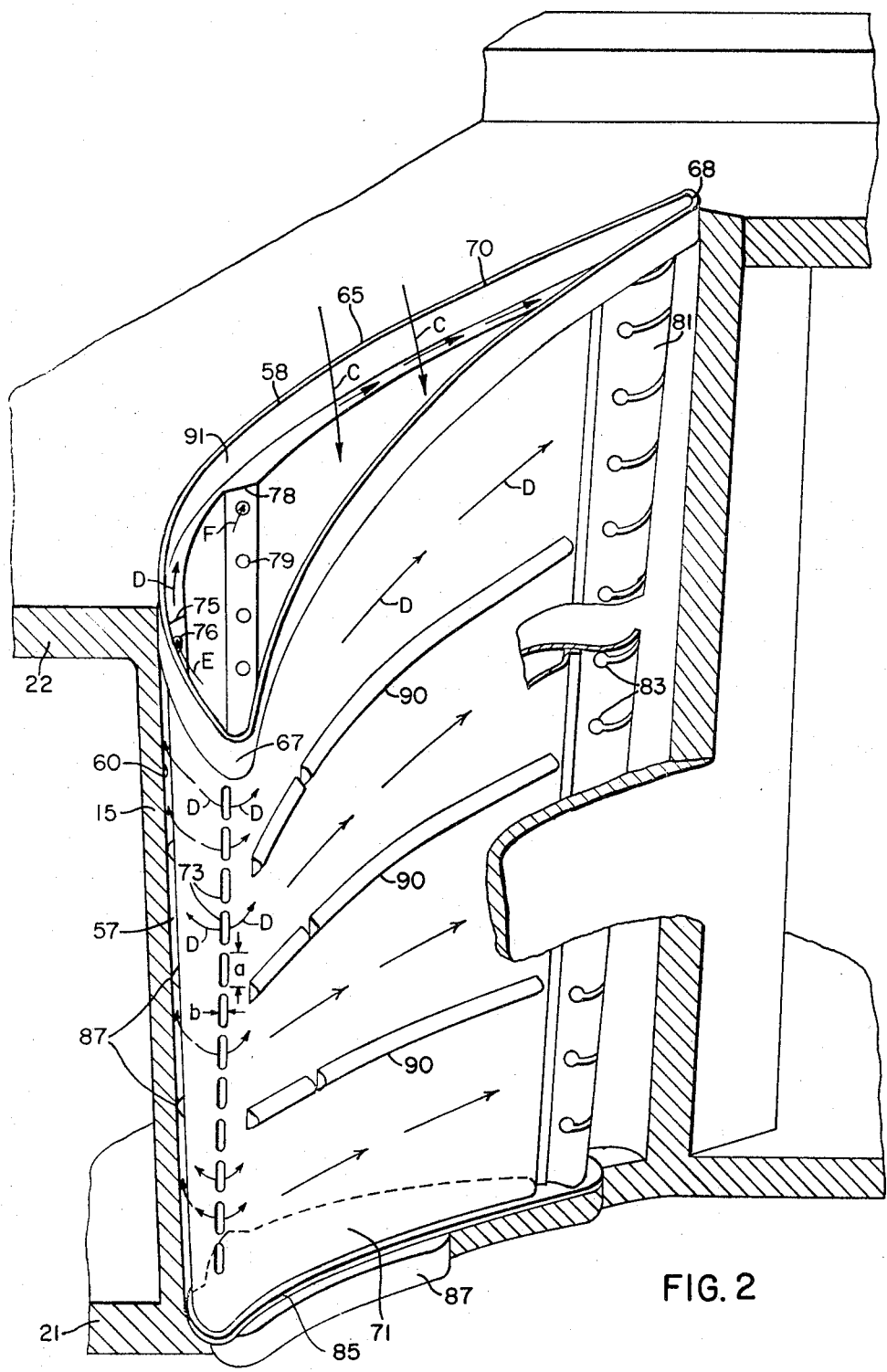
FIG. 2 is an enlarged isometric view partly in section of one vane structure shown in FIG. 1.

On the leading edge 67 of the frame 58 is a plurality of apertures 73 disposed along the radial height of the frame. The apertures 73 as shown are oblong in shape and have a longer radial height a than width b (FIG. 2). Apertures 73 provide fluid communication between the inside of the frame 58 and the airfoil passageway 61.

Figure 3:
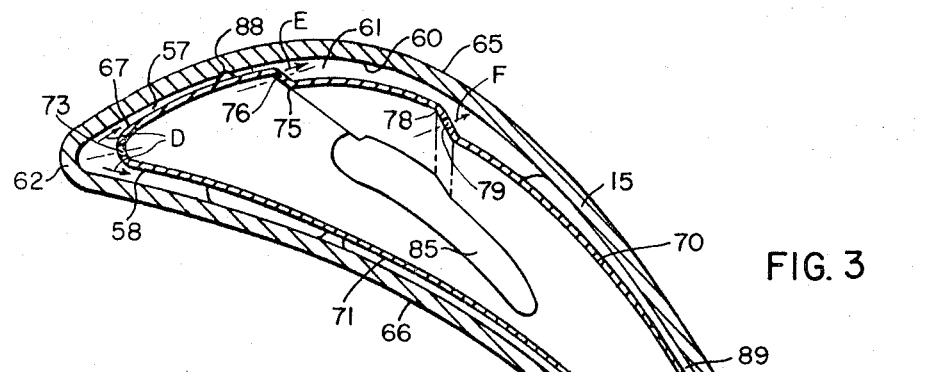
FIG. 3 shows an enlarged view taken along line III—III in FIG. 1.

On the convex side wall 65 is a first indented wall portion 75 (FIGS. 2 and 3). A plurality of circular apertures 76 are disposed along the radial height of the frame 58 on the indented wall portion 75 of the convex side wall 70. The apertures 76 are inclined at an acute angle relative to the internal vane wall 60.

Downstream of the indented wall portion 75 is a second indented wall portion 78. A plurality of circular apertures 79 are disposed along the radial height of the indented wall portion and are inclined at an acute angle relative to the internal vane wall 60.

At the trailing edge 68 of the frame 58 is an expandible seal structure 81 (FIGS. 2 and 3). The expandible seal structure 81 can be an integral part of the frame 58 and extends further downstream into the passageway 61. The seal structure 81 is hook shaped and extends along the entire radial height of the frame. A plurality of apertures 83 are disposed along the radial height of the seal at spaced intervals and provide fluid communication between the convex side and the concave side of the passageway 61. The expandable seal structure is made resilient to assist in properly positioning the frame 58 within the cavity 57 and to provide uniform sealing along the radial height of the seal surface, resulting in uniform metering of cooling flow through circular apertures 83. Mixing of uniformly metered flow from the convex and concave side of passageway 61 provides a regulated supply of cooling fluid flowing through the exit cooling passageways 84 which are disposed along the trailing edge 63 of the vane 15.

Figure 4:
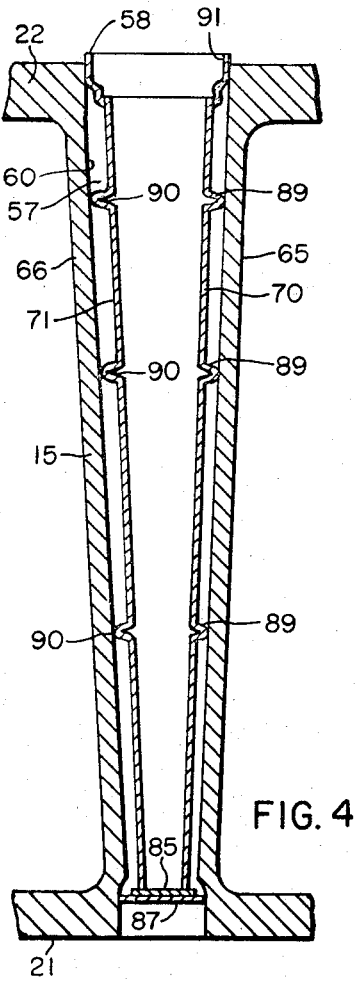
FIG. 4 shows an enlarged view along line IV—IV in FIG. 1.
Figure 6:
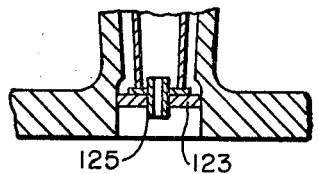
FIG. 6 is an enlarged sectional view taken along line VI—VI in FIG. 1.

On the radially inner portion of the frame 58 is an end plate sealing member 85 of airfoil shape which prevents cooling fluid communication between passageway 61 and the area inside of the frame 58 at the radially inner portion of the frame. As best seen in FIGS. 2 and 4, sealing plate 87, also of airfoil shape prevents fluid communication between passageway 61 and the hot motive fluid 20 through the inner shroud 21 of vanes 15.

On the convex side wall 65, there is disposed a plurality of dimple-like structures 88, which structures are positioned immediately upstream of the indented wall portion 75. The dimple-like structures 88 assist to properly position the frame 58 within the cavity 57.

On the convex side wall 70 of the frame is also disposed a series of positioning structures 89 (FIG. 3) to assist in properly positioning the frame. On the concave side wall 71 of the frame 58 is a series of three positioning structures 90, as best seen in FIGS. 2 and 4. The radially outer portion 91 of the frame 58 is secured to the radially outer shroud 22 of the vane 15 (FIG. 4).

Figure 5:
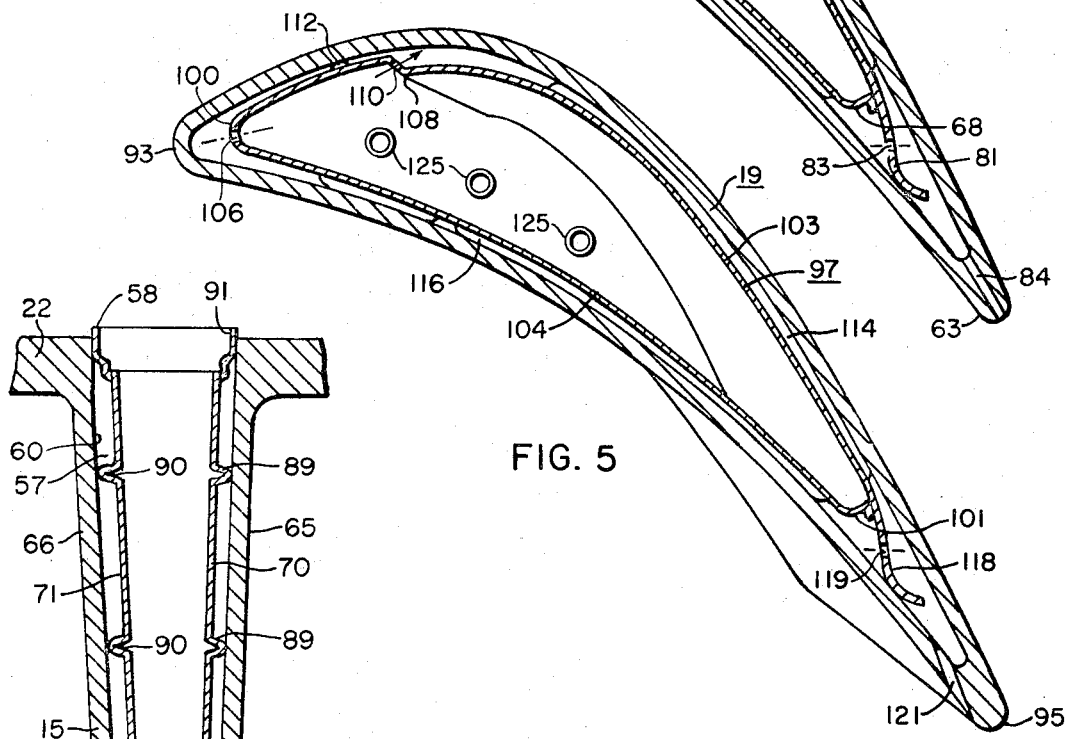
FIG. 5 is an enlarged view taken along line V—V in FIG. 1.

The second row of vanes 19 are similar to the first row of vanes 15 except for the following. The second row of vanes 19 increase in radial height in a downstream direction from the leading edge 93 to the trailing edge 95 (FIGS. 1 and 5). A hollow frame 97 of general airfoil cross-section is disposed within the vane 19 and is in spaced relation therewith. The frame 97 has a leading edge 100 and a trailing edge 101, the edges being connected by a convex side wall 103 and a concave side wall 104. A plurality of apertures 106 are disposed along the radial height on the leading edge 100 of the frame 97. On the convex side wall 103 is an indented portion 108 on which is disposed a plurality of apertures 110, the apertures being disposed along the entire radial height thereof. The apertures are inclined relative to the internal wall of the vane 19.

A plurality of dimple like projections protrude from the convex side wall 103 immediately upstream of the indented wall portion 108. The local dimple like protrusions 112 are positioned along the radial height of the frame 97 and assist in properly positioning the frame from the internal wall of the vane 19.

Downstream of the indented wall portion 108 are positioning structures 114 which project outwardly from the convex side wall 103 of the frame 97.

On the concave side wall 104 are a plurality of positioning structures 116. At the trailing edge 101 of the frame 97 is an expandable seal structure 118 having a plurality of apertures 119 disposed along its radial height and providing fluid communication between the convex and concave side of the fluid flow passageway.

There are a plurality of air exit apertures 121 along the vane concave side upstream of the trailing edge 95 providing fluid communication between the hollow vane 19 and the external surface of vane 19, which directs the hot motive fluid 20.

An insertible closure member 123 is disposed in the radially inner portion of the vane 19 and has a plurality of hollow tubular members 125 disposed radially therein to provide fluid communication between the cavity defined within the frame 103 and the seal structure 53 (FIG. 1).

In operation, pressurized air from the outer plenum chamber 31 (FIG. 1) flows through the tubular inserts 30 and 48 as indicated by the arrows B and flows into the inner plenum chambers 28 and 46. From the plenum chambers 28 and 46 the pressurized cooling air then flows into the vanes 15 and 19 as indicatd by the arrows C.

Pressurized air C is forced through the oblong apertures 73 and perpendicularly strikes the internal wall of the leading edge 62 (FIG. 3), to provide direct impingement cooling of the leading edge. The apertures 73 are oblong rather than circular in shape since for a comparable aperture area, the cooling air can be more accurately directed to the internal wall of the leading edge 62 of the vane. Furthermore, by using oblong apertures, more uniform cooling can be achieved at the leading edge then if circular apertures were used since the width B of the apertures is substantially uniform and closely spaced along the radial height of the leading edge 67 of the frame 58. The use of circular apertures requires a greater number of apertures having larger radial spacings and increased widths b (i.e., diameters) for an equivalent cooling flow area when compared to the oblong apertures. These increased widths and larger radial spacings between apertures can cause non-uniformity in leading edge cooling with the existence of variations in aperture location and vane side-to-side static pressure gradients.

After impinging upon the internal wall of the leading edge 62 of the vane 15, the cooling air divides as indicated by the arrows D in FIGS. 2 and 3, one portion flowing in the passageway 61 to impinge and convectively cool the internal wall on the convex side wall 65 of the vane and the other portion to impinge and convectively cool the internal wall on the concave side wall 66 of the vane.

Pressurized cooling air is also ejected through the circular apertures 76 in the indented wall portion 75 of the frame 58. As previously mentioned, the convex wall portion 65 of the vane has a higher heat flux than the concave portion 66. Therefore, additional cooling air is injected through the apertures 76 into the passageway 61 as indicated by the arrows E to directly impinge upon the internal wall of the convex side wall 65 and to provide additional impingement and convective cooling locally along passageway 61. The apertures 76 are circular in shape for better penetration through the partially spent cooling air from the apertures 73.

Furthermore, for a given cooling requirement there is a range of particular circular hole sizes, centerline spacings in the radial direction, and hole inclination to the vane inner surface for the cross-flow of partially spent coolant which must be penetrated. The apertures are inclined relative to the internal wall portion of the vane, the greater the inclination of the apertures the greater the surface coverage, however, the localized cooling effect is reduced. The apertures 76 are positioned at a location where the cooling effectiveness of the air from the apertures 73 is diminished and a high cooling requirement exists.

In the first row of vanes 15 because of the high temperatures and high heat flux therein, further cooling of the convex side wall 65 of the vane is desirable. Correspondingly, cooling air is projected through the apertures 79 as indicated by the arrows F for direct impingement of the cooling air upon the internal side wall of the vane. The apertures 79 are located where the cooling effectiveness of the air from the apertures 73 and 76 is substantially reduced. As with apertures 76, apertures 79 are inclined relative to the internal wall of the convex side 65 for the reasons previously cited.

The expandable seal structure 81 in FIG. 3, and the seal structure 118 in FIG. 5 assist to properly position the insertible frames 58 and 97 into each corresponding vane. The seal structure is made resilient which allows more flexibility of the frame and enables the more expensive vane portion to be made with lower tolerances. An additional function of the seal structures 81 and 118 is that in cooperation with the apertures.

The seal structure allows for cooling fluid metering through apertures 83 and 119 and likewise pressurizes the coolant passageway on the concave side 71 and 104 such that the static pressures on each side of the leading edge apertures 73 and 106 are equalized preventing deflection of the cooling jets impinging at the leading edge.

The positioning structures 90 (FIGS. 2 and 3) and 116 (FIG. 5) channelize the flow of the cooling fluid along the concave side wall 71 and 104, respectively, in a manner to insure proper cooling thereon and to prohibit radial flow of the cooling air along the height of the vane, as well as flow circulating between the concave side 71 and 104 and the convex side 70 and 103.

What is disclosed then is a cooling system for a turbine vane structure, which cooling system effectively directs cooling air to the leading edges 62 and 93 of the turbine vanes 15 and 19, and, additionally, directs cooling air to the convex side walls 65 and 103, of the vane structures. The apertures directing the cooling fluid to the sidewalls are inclined relative to the side walls and are circular to provide more jet penetration and effective cooling of the convex side walls. Additionally, the trailing edges 68 and 101 are provided with expandible seal structures 81 and 118 which effectively position the frames 58 and 97 within the vane structures and also insures an even distribution and accurate directional control of cooling air through the apertures in the leading edges 67 in 100 of the frames.

Although more than one embodiment has been shown, it is intended that all the matter contained in the foregoing description and shown in the accompanying drawings, shall be interpreted as illustrated and not in a limiting sense.

What is claimed is:

1. A vane structure for an elastic fluid axial flow machine, said vane structure being generally of airfoil shape with leading and trailing edges and having a convex side and a concave side connecting said edges, said vane structure having an internal cavity defined by the internal surfaces of said sides, a frame structure having leading and trailing edges connected by a convex side and a concave side, said frame conforming generally to the configuration of said cavity and being disposed in the cavity in spaced relation with the internal surfaces thereof to define coolant fluid passages extending from the leading edge to the trailing edge of the vane between the corresponding sides of the vane and of the frame, said frame being open at one end to receive coolant fluid and being closed at the other end, a first row of apertures in the leading edge of the frame, the convex side of the frame having at least one indented portion forming an elongated surface extending from one end to the other of the frame and being inclined at an acute angle with respect to the adjacent internal surface of the vane, a second row of apertures in said elongated surface, and discharge passage means in the trailing edge of the vane for escape of the coolant fluid.

2. The structure of claim 1 and including means on the sides of the frame to direct the flow of coolant fluid from the leading edge to the trailing edge of the vane.

3. The structure of claim 1 in which the frame structure has a sealing portion engaging one side of the vane adjacent the trailing edge, the sealing portion having a row of apertures therein adapted to equalize the fluid pressures on opposite sides of the vane.

4. The structure of claim 3 and including means on the sides of the frame to direct the flow of coolant fluid from the leading edge to the trailing edge of the vane.

* * * * *